(No Model.) 2 Sheets—Sheet 1.

R. A. SIMPSON.
BUTTER MOLDING AND CUTTING MACHINE.

No. 561,351. Patented June 2, 1896.

Witnesses:

Inventor
Rufus A. Simpson
By Dewey & Co.
Att'ys (No Model.) 2 Sheets—Sheet 2.

R. A. SIMPSON.
BUTTER MOLDING AND CUTTING MACHINE.

No. 561,351. Patented June 2, 1896.

Witnesses,
J. H. Nurse
H. F. Ascheck

Inventor
Rufus A. Simpson
By Dewey & Co.
Attys

UNITED STATES PATENT OFFICE.

RUFUS A. SIMPSON, OF FERNDALE, CALIFORNIA.

BUTTER MOLDING AND CUTTING MACHINE.

SPECIFICATION forming part of Letters Patent No. 561,351, dated June 2, 1896.

Application filed May 14, 1895. Serial No. 549,275. (No model.)

*To all whom it may concern:*

Be it known that I, RUFUS A. SIMPSON, a citizen of the United States, residing at Ferndale, county of Humboldt, State of California, have invented an Improvement in Butter Molding and Cutting Machines; and I hereby declare the following to be a full, clear, and exact description of the same.

My invention relates to that class of machines for molding and cutting butter in which independent removable strips are mounted upon a suitable bed which is bounded by removable walls, forming a receptacle within which the butter is packed and molded, the molded mass being subsequently cut into proper squares upon the removal of the walls.

My invention consists in the novel details of construction and arrangement relating to the removable walls of the molding-box, the adjustable guide-frame for the cutter, the adjustable partition for the molding-box, and other parts, all of which I shall hereinafter fully describe and specifically claim.

The object of my invention is to simplify the construction of this class of devices or machines, effecting thereby economy in their manufacture, and also increasing their efficiency.

Figure 1:
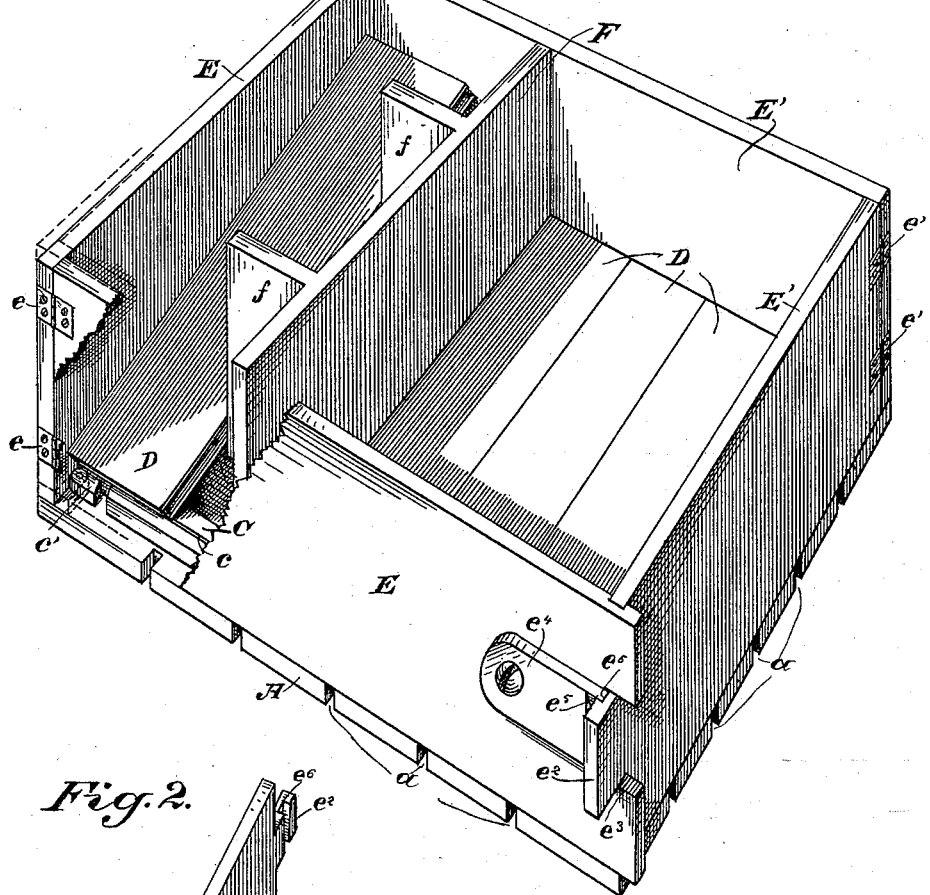
Figure 2:
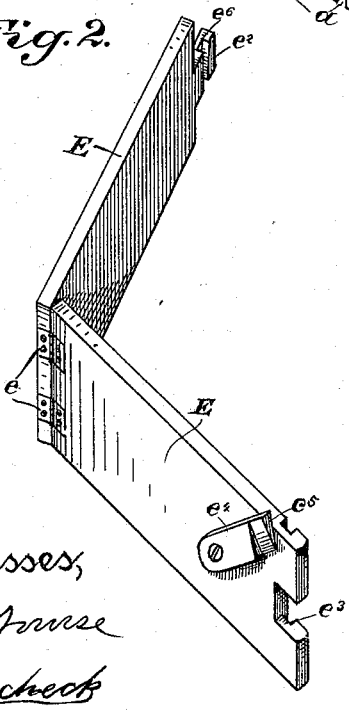
Figure 3:
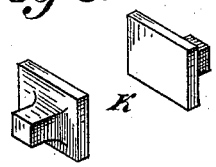
Figure 4:
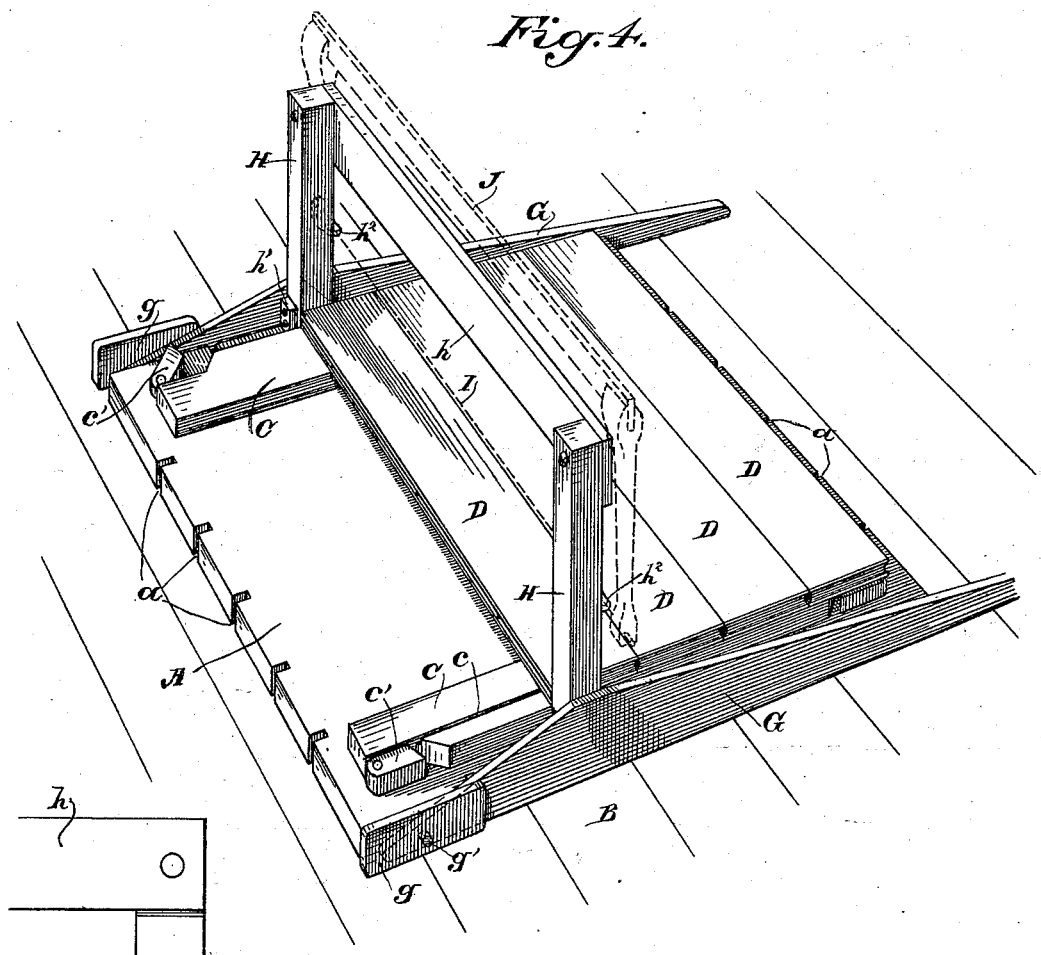
Figure 6:
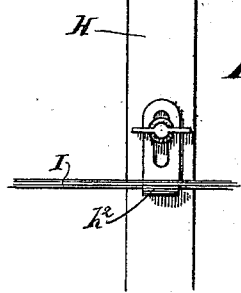
Figure 5:
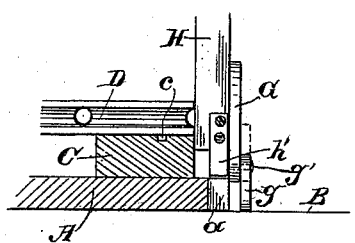

Referring to the accompanying drawings for a more complete explanation of my invention, Figure 1 is a perspective view of my molding-box, showing the adjustable partition in place, one of the walls of the box being broken away to show the interior parts. Fig. 2 is a perspective view of one of the hinged sections of which the walls of the box are composed. Fig. 3 is a perspective view of the butter-square-handling tools. Fig. 4 is a perspective view of the bed, the walls having been removed, and showing the cutter-frame in position, the cutter being shown in dotted lines and connected with the frame in a manner adapting it to be used to make a cut in a horizontal plane, as will be hereinafter described. Fig. 5 is a cross-section through one corner of the bed, showing the side of the cutter guide-frame in a position raised up to effect the horizontal cutting, as just mentioned. Fig. 6 is a detail perspective view showing the adjustable brackets for the cutter when in the position to cut the mass of butter in a horizontal plane.

The bed A of the molding-box is supported, as will be seen in Fig. 4, upon a table or other frame B. This bed has made in its four edges the notches $a$, Figs. 1 and 4. Upon the bed are fixed cleats C, one of which, as shown in the nearer one of Fig. 4, is provided with a groove $c$, which is also seen in the section of Fig. 5, and may be also seen in Fig. 1 through the broken-away portion of the wall.

D are the independent supporting-strips, which are laid upon the cleats C side by side and form the temporary bed for the mass of butter when being molded. These strips fit each other closely and merely lie loosely upon the supporting-cleats C.

The sides or walls of the box are made in two hinged sections or pairs. One of these pairs, E, is shown in Fig. 2, the adjacent edges of its members being united by hinges $e$. This pair forms two walls of the box, and the other pair, E', (shown in Fig. 1,) hinged together by hinges $e'$, forms the remaining walls of the box. The two pairs or sections are united to each other at diagonally opposite corners by means of a tongue $e^2$ on one of the members of each, fitting in a socket $e^3$ on the end of the adjacent member of the other, and a pivoted latch $e^4$, the end of which is wedge-shaped, as shown at $e^5$ in Fig. 2, is adapted to engage with a correspondingly shaped groove $e^6$ in the opposing part. The details of this connection are seen clearly in Fig. 2, while the completed fastening is shown in Fig. 1.

In the operation of the device the butter is packed into the box thus formed, and when compact enough the sides or walls E and E' are removed. This is done by releasing the fastening just described, and then these sides may be taken off readily by bending each pair about its own hinge, thereby removing it squarely and horizontally from the wall of the mass of butter instead of having to lift it therefrom. Thus the walls are removed with ease from the mass of butter and without disturbing it in any manner.

When it is desired to reduce the capacity of the box, I have the partition-wall F, Fig. 1, and in order to adjust this with accuracy to the widths of the several independent strips D D, I have on the back of said partition-wall F the pieces $f$, which have a width equal to the width of one of the strips D. When, therefore, the capacity of the box is to be reduced by the width of a single strip D, it is only necessary to remove one of said strips and to put in the partition-wall F with its back strips $f$ bearing against one of the walls of the box; but where it is desired to further reduce the capacity of the box I take one of the strips D and place it behind the back pieces $f$ of the partition-wall F, as I have shown in Fig. 1, and by placing more of the strips D in this position the partition F may be moved farther along in the box to decrease its capacity, as desired.

In order to nicely adjust the strips D in the position behind the pieces $f$ of the partition-wall F, they are laid in lightly at an inclination, with one end resting against a wall of the box and the lower edge of the other end resting within the groove $c$ of the cleat C, as I have shown in Fig. 1, and to support this strip D in this position is the object of this groove.

In order to provide for accurately cutting the mass of butter as it lies upon the strips D, after the side walls E and E′ have been removed, I have a guide-frame which is constructed as follows:

G are the foot-strips, having considerable length and adapted to move over the table B beside the bed A. From these foot-strips rise standards H, Fig. 4, united by a cross-bar $h$, and said standards have at their lower portions small blocks $h'$, which are adapted to fit down into the notches $a$ in the bed A. As these notches $a$ are separated by the width of the strips D, it follows that when the blocks $h'$ engage said notches the standards H are in the vertical planes of the joints between said strips D, as shown in Fig. 4.

The cutter I (shown in dotted lines in Fig. 4) is a wire or other suitable piece carried by a frame J. The wire is brought down beside the standards H, which serve as a guide therefor, and thus the mass of butter is cut through by said wire in the vertical planes of the edges of the boards or strips D, and thereupon the board upon which the cut off strip of butter rests may be removed. Then the standards H are lifted and moved ahead, so that their blocks $h'$ engage with fresh notches $a$ in the bed A, and the cutting is repeated. As the notches $a$ are all around the bed, the mass of butter may be cut in directions at right angles and into proper lengths or squares.

In order to provide for cutting the mass of butter in a horizontal plane, I have upon the standards H adjustable brackets $h^2$, which, as is shown in Fig. 6, are bent pieces having elongated slots secured by a screw, whereby they may be vertically adjusted. In these brackets the cutting-wire I rests, as is shown in Fig. 4, and then the frame J of the cutter and the standards H of the guide-frame are grasped at the same time and the whole guide-frame with the attached cutter is moved along horizontally, the foot-strips G sliding over the table B. The adjustment of the brackets $h^2$ provides for the vertical movement of the cutter I to different planes, as may be desired.

In order to prevent the blocks $h'$ of the standards H from interfering with the notches $a$ in the bed during this sliding movement of the guide-frame in cutting horizontally, I provide for temporarily raising the foot-strips G during this operation, and this is accomplished by means of the shoe-pieces $g$, Fig. 4, which are pivoted to the strips by pivots $g'$. The location of these pivots with respect to the width of the shoe-pieces is eccentric—that is, it is such that when said shoe-pieces are turned, as shown in Fig. 4, the foot-strips G rest on the table, but when they are turned through a half-revolution, as is shown in Fig. 5, the eccentric location of the pivot-points $g'$ causes said shoe-pieces to raise the foot-strips G from the table and thereby to lift up the blocks $h'$ above the bed A, so that they will not interfere with the notches $a$.

In some cases in order to increase the capacity of the mold-box with respect to depth I have pivoted to the cleats C the resting-blocks $c'$. These when not in use lie close in to the cleats, but when they are to be used they are turned outwardly, as is shown in the farther one in Fig. 4, so that the lower edges of the walls or side pieces E E′ may rest upon them instead of resting directly upon the bed A, as they are shown to rest in Fig. 1.

In Fig. 3 I show two small hand implements K by which the squares of butter after being cut are grasped and handled.

The independent supporting-strips D have grooves at their ends to enable them to be readily taken hold of and lifted when loaded with butter. Being wholly inside the encompassing walls these strips D may be reversed when worn, as they are alike on both sides.

Having thus described my invention, what I claim as new, and desire to secure by Letters Patent, is—

1. A butter-molding device consisting of a stationary bed having cleats extending across its opposite sides, a temporary and removable bed above the stationary bed and formed of a series of transversely-extending boards placed side by side with their ends resting loosely upon said cleats, mold sides hinged together in pairs at diagonally opposite angles, and detachable fastenings at the intermediate angles whereby said sides are separable laterally and independently of the bottom boards.

2. A butter-molding device consisting of a fixed bed with cleats extending across opposite sides, a temporary bed on which the butter is molded, consisting of a series of removable transverse boards fitted side to side with their ends resting loosely on said cleats, mold sides hinged in pairs at diagonally opposite angles whereby said sides are separable laterally and independently of the bottom boards, and blocks $c'$ pivoted to the cleats adapted to lie close to the cleats in one position and to be turned outwardly in horizontal planes so that their free ends project beyond the cleats and form a support or rest for the mold sides and increase the depth of the mold.

3. A butter-molding device consisting of a fixed bed, a temporary bed supported above the fixed bed and consisting of a series of removable boards fitted side to side and readily removable independent of the fixed bed, laterally-hinged mold sides having their lower portions passing outside of the ends of said removable boards and resting on the fixed bed below, a partition-wall fitting within the mold sides on the junction-lines of the removable boards, having vertical strips extending from its rear a distance equal to the width on one of the removable boards, one of said cleats having a groove made longitudinally along it into which one edge of a removed bottom board may be fitted so that said board is maintained diagonally behind the partition as a support.

4. In a butter molding and cutting machine, the bed provided with notches around its edges, in combination with the cutter guiding-frame, consisting of foot-strips, standards rising therefrom and blocks secured to the standards, adapted to enter the notches of the base whereby the position of the standards is regulated.

5. In a butter molding and cutting machine, the bed having the notches around its edges, and removable supporting-strips on said bed, each having a width equal to the spaces between the notches of the bed, in combination with the cutter guiding-frame consisting of foot-strips, standards rising therefrom and blocks adapted to engage the notches of the bed whereby the standards are adapted to lie in the vertical planes of the joints between the supporting-strips.

6. In a butter molding and cutting machine a bed provided with notches around its edge, a cutter guiding-frame consisting of slidable foot-strips, with standards rising therefrom, and blocks adapted to enter the notches of the base, brackets carried by the standards for holding the cutter-frame and reversible unevenly-pivoted shoes on the foot-strips of the frame for raising it up to permit its blocks to avoid the notches of the bed.

In witness whereof I have hereunto set my hand.

RUFUS A. SIMPSON.

Witnesses:
H. A. TYRRELL,
C. H. BOYNTON.